United States Patent [19]
Faulkner et al.

[11] Patent Number: 5,453,865
[45] Date of Patent: Sep. 26, 1995

[54] MONITORING SYSTEM

[75] Inventors: David W. Faulkner, Suffolk; John W. Ballance, Suffolk; Donald E. A. Clarke; Michael A. Hale, both of Essex, all of Great Britain

[73] Assignee: British Telecommunications public limited company, London, United Kingdom

[21] Appl. No.: 211,411
[22] PCT Filed: Oct. 1, 1992
[86] PCT No.: PCT/GB92/01807
§ 371 Date: May 24, 1994
§ 102(e) Date: May 24, 1994
[87] PCT Pub. No.: WO93/07687
PCT Pub. Date: Apr. 15, 1993

[30] Foreign Application Priority Data
Oct. 4, 1991 [GB] United Kingdom .................. 9121226

[51] Int. Cl.$^6$ .................................................. H04B 10/08
[52] U.S. Cl. .......................... 359/110; 359/140; 359/152; 359/177; 371/20.1
[58] Field of Search .................................. 359/110, 113, 359/118, 125, 137, 140, 152, 177; 370/108, 124, 132; 371/20–21; 333/152; 364/829

[56] References Cited
U.S. PATENT DOCUMENTS 5,022,752  6/1991  Bu-Abbud ............................. 356/73.1
5,327,277  7/1994  Van Der Plas et al. ................. 359/137

FOREIGN PATENT DOCUMENTS 0318335  5/1989  European Pat. Off. .
2229881  10/1990  United Kingdom .................... 359/110

OTHER PUBLICATIONS

Patent Abstracts of Japan, vol. 4, No. 145 (E–29)(627) 14 Oct. 1980, JP A, 55 097753 (Matsushita Denki).
Patent Abstracts of Japan, vol. 7, No. 138 (P–204)(1283) 16 Jun. 1983, JP A,58053772 (Nippon Denshin).
Patent Abstracts of Japan, (E–77) (8340) 12 Dec. 1977, JP A 52098402 (Kumio Kasahara).
Okada et al., "Optical Cable Fault Location Using Correlation Technique", Electronics Letters, vol. 16, No. 16, Jul. 1980, Stevenage GB, pp. 629–630.

Primary Examiner—Leo H. Boudreau
Assistant Examiner—Kinfe-Michael Negash
Attorney, Agent, or Firm—Nixon & Vanderhye

[57] ABSTRACT

A system for monitoring a network in which a station is connected to the network and includes a transmitter and a receiver. The transmitter outputs a signal modulated with outgoing traffic onto the network and the receiver receives a signal from the network modulated with incoming traffic. The station includes a monitoring circuit which introduces a variable delay in a signal from the transmitter and combines the delayed signal with the received signal so as to produce an output dependent upon the correlation of the signal from the transmitter and the received signal at the given delay. Preferably, the network is an optical network and the delay is introduced by a programmable delay line.

23 Claims, 3 Drawing Sheets

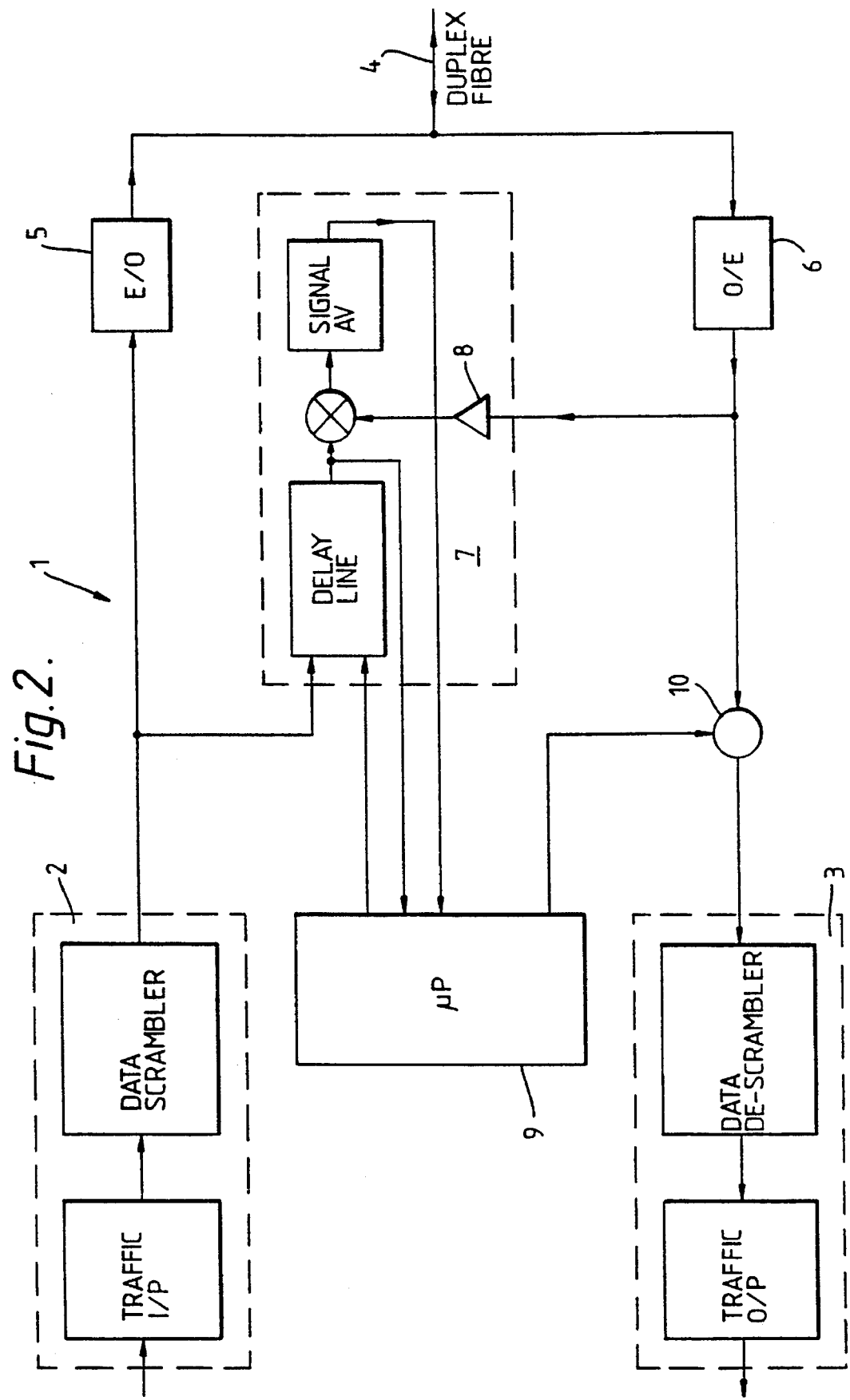

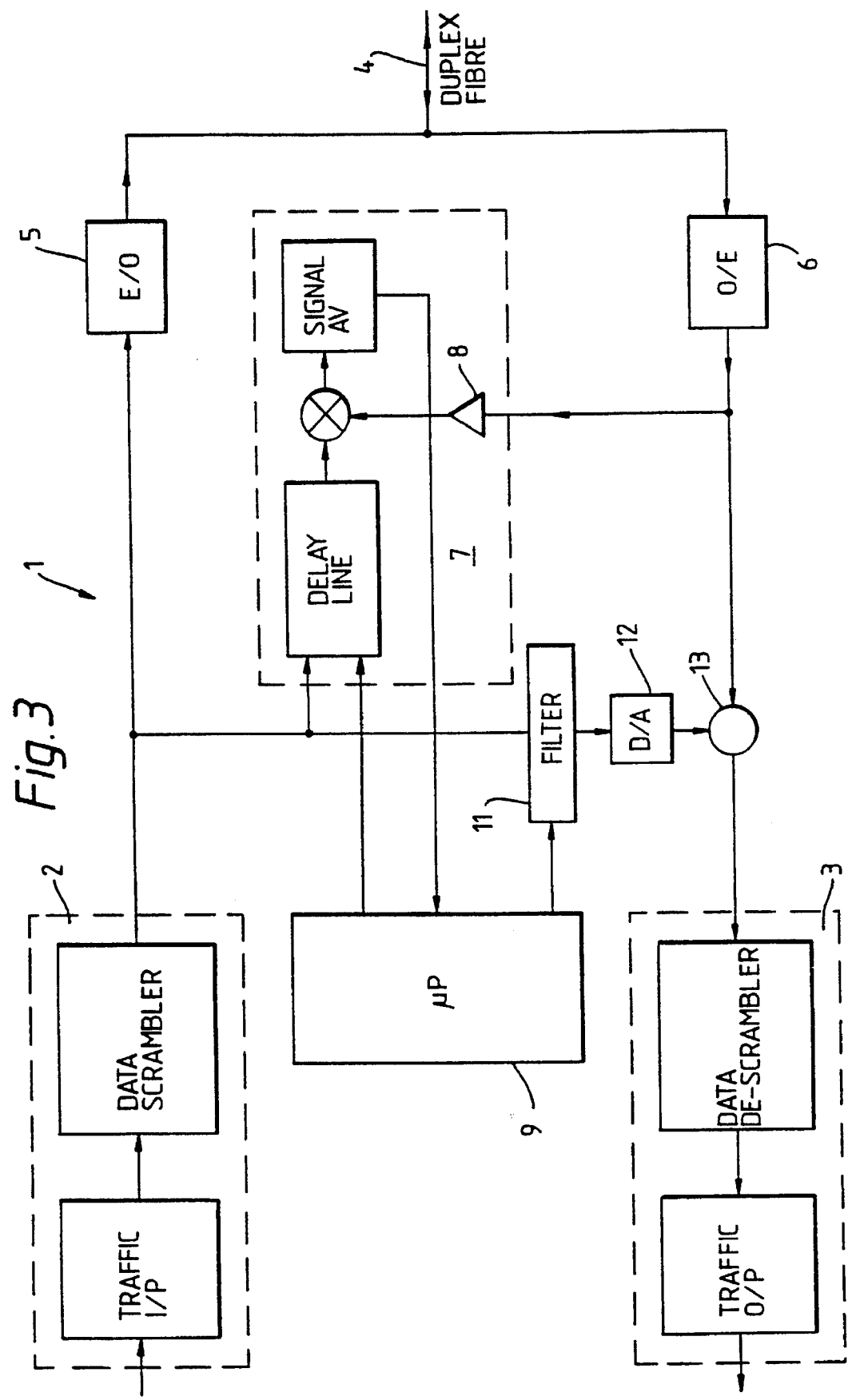

MONITORING SYSTEM

FIELD OF THE INVENTION

The present invention relates to a system for monitoring the performance of a network. The system is suitable for use, for example, in a TPON (Telephony on a Passive Optical Network) system, but also may be used in other contexts.

BACKGROUND OF THE INVENTION

Conventionally, installed optical fibre networks have been tested to detect a fault such as a break in the network by connecting a dedicated optical time domain reflectometer (OTDR) to the network. The OTDR typically comprises a high power optical source which transmits a pulse onto the network. Light back-scattered from faults in the network is detected and correlated with the transmitted pulse to determine the location of the fault giving rise to the back-scattered signal.

As described in the present applicant's earlier international application WO 91/02959 the use of dedicated OTDR equipment has significant disadvantages. In particular it requires the interruption of the service normally carried on the network and so is normally used only after a failure occurs and is not suitable for continual monitoring of the network. The system described and claimed in the above cited application proposes the transmission of an appropriately coded OTDR signal as a part of each downstream data frame sent onto the network. In the preferred example the test pulse sequence is a Barker or Golay code transmitted in a header portion of a multiplexed data frame. Although this arrangement does make it possible to monitor the network continually there is then the disadvantage of a significant transmission overhead associated with the dedicated OTDR codes and a subsequent loss of bandwidth which might otherwise be used for data or for other system control functions.

SUMMARY OF THE INVENTION

According to a first aspect of the present invention, there is provided a system for monitoring a telecommunications network, the system comprising a station connected to the network and including a transmitter for outputting a signal modulated with outgoing traffic onto the network and a receiver for receiving a signal from the network, the system further comprising a monitoring circuit including means for introducing a variable delay in said modulated signal from the transmitter, and means for combining the delayed signal with the received signal so as to produce an output dependent upon the correlation of said modulated signal from the transmitter and the received signal at the given delay.

The system of the present invention rather than using a dedicated OTDR probe signal as with the prior art systems, continually monitors the correlation between the output signal and the received signal as a function of a variable delay between those signals. In this manner, at a delay corresponding to the location of a fault in the network a peak in the correlation output is detected. This approach is able to provide improved sensitivity by comparison with the prior art systems since the entire signal power transmitted is monitored for reflections.

If the network is duplex then the receiver is arranged to receive a signal modulated with incoming traffic, and if the network is simplex then there will be a respective transmitter/receiver pair for both the downstream (transmit) and upstream (receive) paths of the network, each pair having an associated monitoring circuit. The transmitter associated with the receive path may also be arranged to transmit outgoing traffic.

Preferably the network is an optical network and the transmitter and receiver are arranged to transmit and receive optical signals. Preferably the system further comprises means for progressively varying the delay.

The system of the present invention brings particular advantages when used in the context of an optical network. It often happens in such a network that a local fault in one branch of the network leaves other parts of the network functioning normally. Accordingly using the system of the present invention it is possible for transmission and reception of data to continue as normal on the other parts of the network while the local fault is detected and appropriate measures to correct the fault taken. This contrasts with the prior art systems, where it would have been necessary to interrupt the operation of the entire network in order to connect a dedicated OTDR.

According to a second aspect of the present invention, there is a provided a method of monitoring a telecommunications network in which a station connected to the network includes a transmitter which outputs a signal modulated with outgoing traffic onto the network and a receiver which receives a signal from the network, the method comprising the steps introducing a variable delay in said modulated signal from the transmitter, and combining the delayed signal with a signal received from the network so as to produce an output dependent upon the correlation of said modulated signal from the transmitter and the received signal at the given delay.

BRIEF DESCRIPTION OF THE DRAWINGS

Examples of the system and method in accordance with this invention will now be described in detail with reference to the accompanying drawings, in which:

FIG. 2 shows the head-end station incorporating means for cancelling a reflection; and FIG. 3 shows an alternative of the FIG. 2 embodiment.

DETAILED DESCRIPTION OF THE DRAWINGS

Figure 1:
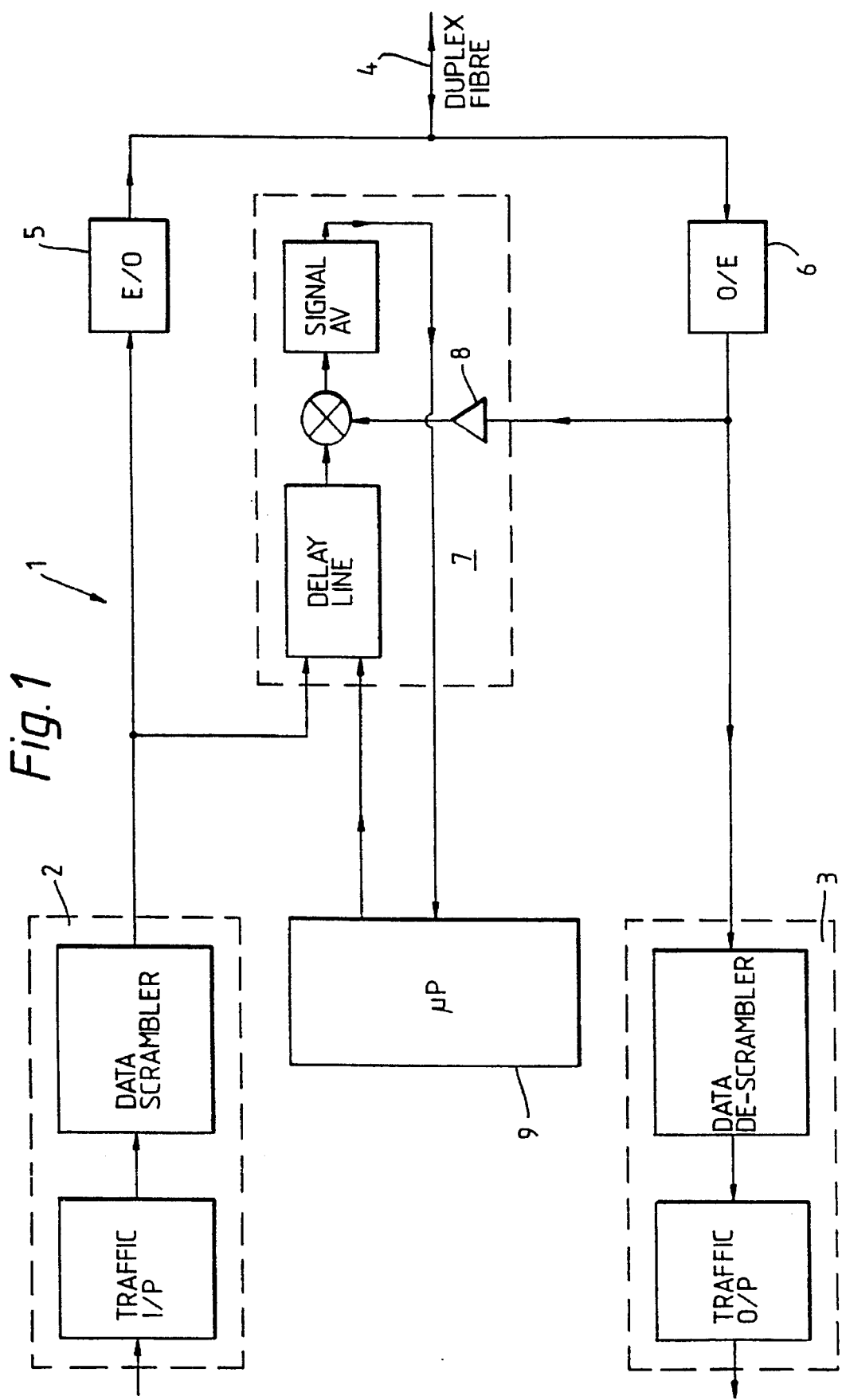
FIG. 1 is a block diagram showing schematically a head-end station incorporating the monitoring system of the present invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

A head-end station 1 for use in a TPON (Telephony on a Passive Optical Network) system includes a transmitter stage 2 and a receiver stage 3 coupled to a duplex optical fibre network 4. The head-end station is arranged to transmit and receive data in multiple access time division multiplex frames using a Bit Transport System (BTS) as described in detail in the present applicant's U.S. Pat. No. 4,977,593. The transmitter stage 2 comprises an input for traffic data and a data scrambler which scrambles the broadcast data stream using a pseudo-random binary sequence (PRBS) generator. Scrambling the data in this manner ensures that the broadcast data stream has a long autocorrelation length. A complementary process is carried out in the receiver stage with the data passing through a data de-scrambler and then to the traffic output.

The head-end station 1 includes an electro-optical converter 5 connected to output optical signals onto the network 4 in response to data output by the transmitter stage together with an opto-electrical converter 6 connected in a complementary fashion to convert incoming optical signals received from the network 4 into an analogue electrical signal which is input to the receiver stage 3. The transmitter stage 2 and the E/O convertor 5 together comprise the "transmitter" of the present invention. Similarly, the receiver stage 3 and the O/E convertor 6 comprise the "receiver" of the present invention.

The head-end station includes a monitoring circuit 7 which, as described below, continually monitors the return from the network as data is transmitted. The monitoring circuit includes a programmable delay line and a signal averager.

The monitoring circuit 7 operates in the electrical analogue domain. A first input to the monitoring circuit 7 is connected in common with the electro-optical converter 5 at the output of the transmitter stage 2. The second input to the monitoring circuit 7 is connected in common with the input to the receiver stage 3 so as to receive the electrical output from the opto-electrical converter 6. The first input to the monitoring circuit 7 is fed through the programmable delay line and then combined with the second input at an Exclusive Or Gate. The second input passes through an amplifier 8 before being combined with the first input. The resultant signal contains a DC component proportional to the degree of correlation between the incoming signal, which includes any signal back-scattered from the fibre etc, and the signal originally transmitted. The delay applied by the delay line is progressively scanned, and any peaks in the correlation as a function of the delay identified. Such peaks indicate a high probability of a significant reflection at a fibre distance corresponding to the delay in question.

The output from the monitoring circuit is supplied to a control processor 9. The control processor 9 also provides the control input which determines the delay applied by the programmable delay line. The control processor 9 may be arranged to store a reference scan of the network taken at commissioning time. Subsequent scans are then compared with the reference scan. Any significant deviations in the reference scan will then provide a clear indication of actual or incipient faults. When a fault is detected, the control processor 9 may output an appropriate alarm signal to the maintenance and diagnostics system of the network. The processor 9 may also display the output of the monitoring circuit on a suitable display device such as a CRO.

If a fault in the network is such as to cause the transmission of data to be suspended, the system of the present invention may still be used to locate and diagnose the fault. In this case, a constant input is applied to the data scrambler 2 in place of the traffic input. That constant input is then modulated in accordance with the pseudo-random binary sequence and output onto the network. The return from the network is then analysed as described above.

Although in the embodiment described above the correlation of the signals is carried out in the electrical domain other arrangements are possible in which, for example, the signals are mixed optically to provide the required correlation signal. Also, although it has special advantages when used in the context of an optical network, the present invention is also applicable, for example, to an electrical coaxial communications network.

In the embodiment shown in FIG. 2 there are provided cancellation means constituted by the processor 9 and a subtractor 10, the processor 9 being arranged upon detection of a reflection to control the subtractor 10 for subtractively combining the output of the delay line, suitably scaled and in analogue form, with the output of the opto-electrical converter 6 so as to cancel that reflection of the data transmission before processing by the data de-scrambler. In an alternative embodiment, shown in FIG. 3, the cancellation means are constituted by a finite impulse response filter 11 to which is fed the output of the transmitter stage 2, the processor 9 which determines and establishes the coefficients of the filter 11, a digital to analogue converter 12 which converts the output of the filter, and a subtractor 13 for combining the output of converter 12 with the output of converter 6. This latter implementation is an effective combination of the delayed signal with the received signal. If the processor 9 has sufficient processing power then cancellation of several reflections can be performed simultaneously.

The delay line of the monitoring circuit 7 may be a finite impulse response filter controlled by suitable coefficients generated by the processor 9, and designed such as to provide a suitable output for driving the converter 12 whereby filter 11 can be omitted.

This aspect of reflection cancellation is mainly of importance where the optical fibre network is a duplex arrangement as shown in the drawings, but may be of use in a simplex arrangement to cancel reflections of the transmitted signal, if the reflected amplitude is not insignificant.

In such a simplex arrangement, separate simplex optical fibre networks are provided for the downstream and upstream transmissions, respectively. In this case a separate optical transmitter will be coupled to the receive port of the head-end station and will preferably be driven by the electrical output of the downstream transmitter which may be attenuated. Similarly, a separate optical receiver will be coupled to the transmit port, and preferably separate reflection detection circuitry provided for the two networks. In other words at the transmitting section of the head-end station there will be circuitry, as shown in FIG. 1, with the exception of a receiver stage 3, and similarly at the receiving section the corresponding circuitry will omit the transmitter stage 2 and the electro-optical converter (transmitter) will be driven, as mentioned, by the output from the transmitter stage in the transmitting section of the head-end station.

We claim:

1. A system for monitoring a telecommunications network, the system comprising a station connected to the network and including a transmitter for outputting a signal modulated with outgoing traffic onto the network and a receiver connected to the network for receiving a signal from the network, the system further comprising a monitoring circuit connected to the transmitter and including a delay circuit for introducing a variable delay in said modulated signal from the transmitter, said monitoring circuit further including a combining circuit connected to said receiver for combining the delayed signal from the delay circuit with the received signal and for producing an output dependent upon the correlation of said modulated signal from the transmitter and the received signal from the receiver at the given delay.

2. A system as claimed in claim 1 for monitoring a network having a single duplex path to the station, wherein said receiver is connected to receive a signal modulated with incoming traffic.

3. A system as claimed in claim 1 for monitoring a network having separate simplex transmit and receive paths, said system including a further transmitter connected for outputting a signal onto the receive path of the network and a further receiver connected for receiving from said receive path of the network a signal modulated with incoming traffic, and a further monitoring circuit connected to the receive path.

4. A system as claimed in claim 3, wherein said further transmitter is connected to output a signal modulated with said outgoing traffic.

5. A system according to claim 3 in which the network is an optical network and the transmitters and receivers transmit and receive optical signals.

6. A system according to claim 3 in which each monitoring circuit further comprises means for progressively varying the delay.

7. A system according to claim 3 in which each monitoring circuit includes a first input connected to receive an electrical signal output from an associated transmitter, a second input connected to receive an electrical signal input to an associated receiver, said delay circuit of each monitoring circuit includes a programmable delay line connected to the first input, and the combining circuit includes inputs connected respectively to the output from the programmable delay line and to the second input of the monitoring circuit.

8. A system as claimed in claim 3, wherein the system includes cancellation means connected to each combining circuit and responsive to a correlation peak from each said combining circuit for subtractively combining the delayed signal with the received signal to cancel a reflection of the signal outputted onto the network.

9. A system according to claim 1, in which the network is an optical network and the transmitter and receiver transmit and receive optical signals.

10. A system according to claim 1, in which the monitoring circuit further comprises means for progressively varying the delay.

11. A system according to claim 1, in which the monitoring circuit includes a first input connected to receive an electrical signal output from the transmitter, a second input connected to receive an electrical signal input from the receiver, said delay circuit including a programmable delay line connected to the first input, and the combining circuit includes inputs connected respectively to the output from the programmable delay line and to the second input of the monitoring circuit.

12. A system as claimed in claim 1, wherein the system further includes cancellation means responsive to a correlation peak from said combining circuit for subtractively combining the delayed signal with the received signal to cancel a reflection of the signal outputted onto the network.

13. A method of monitoring a telecommunications network in which a station connected to the network includes a transmitter which outputs a signal modulated with outgoing traffic onto the network and a receiver which receives a signal from the network, the method comprising the steps of introducing a variable delay in said modulated signal from the transmitter, combining the delayed signal with a signal received from the network and producing an output dependent upon the correlation of said modulated signal from the transmitter and the received signal at the given delay.

14. A method as claimed in claim 13, for monitoring a network having a single duplex path to the station, wherein the signal received from the network is modulated with incoming traffic.

15. A method as claimed in claim 13, for monitoring a network having separate simplex transmit and receive paths to the station, the method further including transmitting with a further transmitter a signal onto the receive path of the network, receiving with a further receiver from said receive path a signal modulated with incoming traffic, introducing a variable delay in a signal from said further transmitter and combining this latter delayed signal with a signal received from said receive path so as to produce an output dependent upon the correlation of the signal from said further transmitter and the signal received from said receive path at the given delay.

16. A method according to claim 15 in which the network is an optical network and the transmitters and receivers transmit and receive optical signals.

17. A method according to claim 15 further comprising progressively varying the delay introduced between the signals from each transmitter and receiver.

18. A method according to claim 15 including applying an electrical signal output from each transmitter to a first input of a corresponding monitoring circuit, supplying an electrical signal input from a corresponding receiver to a second input of the monitoring circuit, passing the signal from the first input of the monitoring circuit through a programmable delay line, and combining the output of the programmable delay line and the signal from the second input of the monitoring circuit.

19. A method as claimed in claim 15 including subtractively combining each delayed signal with an associated signal received from the network, in response to a correlation peak, to cancel from the received signal a reflection of the signal outputted onto the network.

20. A method according to claim 13, in which the network is an optical network and the transmitter and receiver transmit and receive optical signals.

21. A method according to claim 13, further comprising progressively varying the delay introduced between the signals from the transmitter and the receiver.

22. A method according to claim 13 including applying an electrical signal output from the transmitter to a first input of a monitoring circuit, supplying an electrical signal input from the receiver to a second input of the monitoring circuit, passing the signal from the first input of the monitoring circuit through a programmable delay line, and combining the output of the programmable delay line and the signal from the second input of the monitoring circuit.

23. A method as claimed in claim 13, including subtractively combining the delayed signal with the signal received from the network, in response to a correlation peak, to cancel from the received signal a reflection of the signal outputted onto the network.

* * * * *